(12) United States Patent
Iwashita et al.

(10) Patent No.: US 8,108,949 B2
(45) Date of Patent: Feb. 7, 2012

(54) WATERPROOF MOISTURE-PERMEABLE FABRIC FOR CLOTHING AND CLOTHING

(75) Inventors: Kenji Iwashita, Osaka (JP); Hitoshi Itai, Nomi (JP); Motoki Yamazawa, Nomi (JP)

(73) Assignee: Teijin Fibers Limited, Osaka (JP)

( * ) Notice: Subject to any disclaimer, the term of this patent is extended or adjusted under 35 U.S.C. 154(b) by 351 days.

(21) Appl. No.: 12/527,321

(22) PCT Filed: Oct. 24, 2007

(86) PCT No.: PCT/JP2007/071162
§ 371 (c)(1), (2), (4) Date: Aug. 14, 2009

(87) PCT Pub. No.: WO2008/102483
PCT Pub. Date: Aug. 28, 2008

(65) Prior Publication Data
US 2010/0071112 A1 Mar. 25, 2010

(30) Foreign Application Priority Data
Feb. 21, 2007 (JP) .................. 2007-040334

(51) Int. Cl.
*A41D 27/02* (2006.01)
*A41D 31/02* (2006.01)
*A41D 31/00* (2006.01)

(52) U.S. Cl. ............... 2/272; 2/82; 2/87; 2/93; 2/97

(58) Field of Classification Search ............ 2/456, 457, 2/69, 82, 84, 85, 87, 93, 97, 272, 901
See application file for complete search history.

(56) References Cited

U.S. PATENT DOCUMENTS

| | | | | |
|---|---|---|---|---|
| 4,596,616 A | * | 6/1986 | Noda et al. | 156/93 |
| 4,728,564 A | * | 3/1988 | Akagi et al. | 442/164 |
| 5,154,966 A | * | 10/1992 | Tohyama et al. | 442/73 |
| 5,266,354 A | * | 11/1993 | Tohyama et al. | 427/203 |
| 5,859,083 A | | 1/1999 | Spijkers et al. | |
| 6,040,251 A | * | 3/2000 | Caldwell | 442/123 |
| 2002/0197924 A1 | * | 12/2002 | Halley et al. | 442/148 |
| 2004/0116022 A1 | * | 6/2004 | Langley et al. | 442/289 |
| 2009/0286436 A1 | * | 11/2009 | Koide et al. | 442/59 |

FOREIGN PATENT DOCUMENTS

| | | |
|---|---|---|
| EP | 0 783 016 A2 | 7/1997 |
| JP | 9-187897 A | 7/1997 |
| JP | 11-170461 A | 6/1999 |
| JP | 2001-503107 A | 3/2001 |
| JP | 2001-199030 A | 7/2001 |
| JP | 2002-061077 A | 2/2002 |
| JP | 2005-205626 A | 8/2005 |

* cited by examiner

*Primary Examiner* — Bobby Muromoto, Jr.
(74) *Attorney, Agent, or Firm* — Sughrue Mion, PLLC

(57) ABSTRACT

Waterproof moisture-permeable fabric for clothing which includes, on one side of a polyester fabric A, a waterproof moisture-permeable layer B including a colorless transparent polyester film stacked, and a white or gray resin C partially stacked, and clothing including the waterproof moisture-permeable fabric. Preferably, a moisture-permeable polymer resin D containing inorganic fine particles is stacked on the waterproof moisture-permeable layer B, and the white or gray resin C is partially stacked thereon.

16 Claims, 1 Drawing Sheet

WATERPROOF MOISTURE-PERMEABLE FABRIC FOR CLOTHING AND CLOTHING

TECHNICAL FIELD

The present invention relates to a waterproof moisture-permeable fabric for clothing, which is easy to recycle, and is excellent in appearance quality, for use in clothing such as sport clothes, uniform clothes, and rainwear, and clothing including the waterproof moisture-permeable fabric.

BACKGROUND ART

Conventionally, as a waterproof moisture-permeable fabric for clothing for use in clothing such as sport clothes, uniform clothes, and rainwear, there has been known a waterproof moisture-permeable fabric obtained by staking a thin film made of a resin having a waterproof moisture-permeable property on a base fabric. For example, there are known the one obtained by coating porous or nonporous polyurethane directly on a base fabric including a woven or knitted fabric, or the like, and the one obtained by bonding a film made of porous or nonporous polyurethane on a base fabric by the use of an adhesive. Further, such a waterproof moisture-permeable fabric is generally used in such a manner than the film side is situated on the skin side, and the base fabric is situated on the outside air side.

Herein, the waterproof moisture-permeable property is the property to prevent water such as rain from passing therethrough, and to allow moisture (water vapor) to pass therethrough. The thin film made of a porous resin exhibits a waterproof moisture-permeable property according to the size of the pores. Whereas, the thin film made of a nonporous resin contains a hygroscopic material, thereby to be made hydrophilic, and exhibits a waterproof moisture-permeable property.

For these conventional waterproof moisture-permeable fabrics, in order to prevent the waterproof moisture-permeable layer from being worn by the clothes worn on the inner side of the waterproof moisture-permeable fabric, or a skin, the following methods are adopted: a lining is sewn on the waterproof moisture-permeable layer; and a tricot knitted fabric is bonded thereto. However, in such cases, the weight of the waterproof moisture-permeable fabric becomes large. For this reason, unfavorably, wearers of the clothing obtained by using the waterproof moisture-permeable fabric have difficulty in moving.

To this problem, there is proposed the following: a polymer resin is partially stacked on the waterproof moisture-permeable layer including an urethane resin, thereby to protect the waterproof moisture-permeable layer (e.g., see Patent Document 1).

On the other hand, in recent years, products easy to recycle have been demanded from the viewpoints of exhaustion of petroleum resources and global warming.

However, with the waterproof moisture-permeable fabric obtained by stacking a waterproof moisture-permeable layer including an urethane resin on a base fabric, recycling thereof is unfavorably difficult.

Further, as a means for facilitating recycling of the waterproof moisture-permeable fabric, there is proposed a film made of a polyester resin having moisture permeability (e.g., see Patent Document 2). However, upon stacking a polyester film having a moisture permeability on a base fabric including a woven or knitted fabric made of polyester dyed with a disperse dye, the dye migrates to the polyester film, unfavorably resulting in remarkable degradation of the appearance.

Further, as in Patent Document 2, when the film is colored in black or dark gray, the problem of the change in appearance due to dye migration is not caused. However, when the base fabric is colored in light color, unfavorably, the color of the film is seen therethrough from the front side (outside air side).

[Patent Document 1] Japanese Patent No. 3718422
[Patent Document 2] EP0783016 B1

DISCLOSURE OF THE INVENTION

It is an object of the invention to provide a waterproof moisture-permeable fabric for clothing, which is easy to recycle, and is excellent in appearance quality, and clothing. The object can be attained by the waterproof moisture-permeable fabric for clothing, and clothing of the invention.

A waterproof moisture-permeable fabric for clothing of the invention is a waterproof moisture-permeable fabric for use in clothing, characterized by including: on one side of a polyester fabric A, a waterproof moisture-permeable layer B including a colorless transparent polyester film stacked, and a white or gray resin C partially stacked thereon.

Herein, it is preferable that a moisture-permeable polymer resin layer D containing inorganic fine particles is stacked entirely on the waterproof moisture-permeable layer B, and further thereon, the resin C is partially stacked. Further, it is preferable that the brightness of the resin C falls within the range of 15 to 97 in terms of L value. Particularly, it is preferable that the brightness of the resin C falls within the range of 15 to 85 in terms of L value, and that the resin C is gray.

In the waterproof moisture-permeable fabric for clothing of the invention, it is preferable that the polyester fabric A is a woven or knitted fabric including a polyester multifilament. Whereas, it is preferable that the polyester fabric A has been dyed with a disperse dye. Furthermore, it is preferable that the colorless transparent polyester film forming the waterproof moisture-permeable layer B is a colorless transparent nonporous film containing polyester having a moisture permeability as a main component, and having a thickness of 5 to 30 μm. Still further, it is preferable that the moisture-permeable polymer resin forming the moisture-permeable polymer resin layer D is a translucent polymer resin containing silica in a weight ratio of 1 to 16% by weight. Further, it is preferable that the resin C is a polymer resin containing titanium oxide in a weight ratio of 1 to 25% by weight, and carbon black in a weight ratio of 0.1 to 3.0% by weight. It is preferable that such a resin C is a polymer resin further containing silica in a weight ratio of 1 to 16% by weight. Further, it is preferable that the resin C covers the waterproof moisture-permeable layer B in an area ratio in the range of 10 to 80%, and has a continuous pattern. Still further, it is preferable that the resin C covers the moisture-permeable polymer resin layer D containing inorganic fine particles in an area ratio in the range of 10 to 80%, and has a continuous pattern. In that case, it is preferable that the continuous pattern is a lattice pattern.

In the waterproof moisture-permeable fabric for clothing of the invention, it is preferable that the polyester weight ratio in the whole waterproof moisture-permeable fabric is 50% or more.

Further, the clothing of the invention is any clothing selected from a group consisting of sport clothes, uniform clothes, rainwear, and outer clothes, including the waterproof moisture-permeable fabric for clothing such that the film side is the skin side.

BEST MODE FOR CARRYING OUT THE INVENTION

Figure 1:
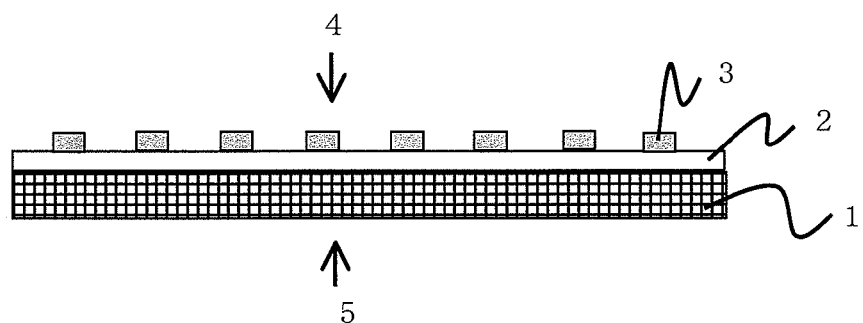
FIG. 1 is a view schematically showing the state of the waterproof moisture-permeable fabric for clothing of the invention, in which a polyester fabric A (base fabric), a waterproof moisture-permeable layer B including a colorless transparent polyester film, and a partially stacked white or gray resin C are sequentially disposed, wherein 1 denotes the polyester fabric A; 2, the waterproof moisture-permeable layer B including a colorless transparent polyester film; 3, the partially stacked white or gray resin C; 4, the film side; and 5, the front side.

In a waterproof moisture-permeable fabric for clothing of the invention, the base fabric on which a waterproof moisture-permeable layer B is stacked is a polyester fabric A mainly including a polyester fiber. In the polyester fabric A, nylon fiber, acetate fiber, polyamide fiber, aramid fiber, carbon fiber, natural fiber such as cotton or wool, or the like may be contained in an amount of about 50% by weight or less, and preferably 30% by weight or less. The polyester fabric A preferably has a higher content of the polyester fiber, and most preferably includes only a polyester fiber from the viewpoint of ease of recycling. The polyester fiber is produced from a dicarboxylic acid component and a diglycol component. It is preferable that terephthalic acid is mainly used as the dicarboxylic acid component. It is preferable that one or more alkylene glycols selected from ethylene glycol, trimethylene glycol, and tetramethylene glycol are mainly used as the diglycol component. Whereas, the polyester resin may contain a third component other than the dicarboxylic acid component and the glycol component. As the third component, there can be used one or more of cationic dye-dyeable anionic components such as sodiosulfoisophthalic acid; dicarboxylic acids other than terephthalic acid, such as isophthalic acid, naphthalene dicarboxylic acid, adipic acid, and sebacic acid; and glycol compounds other than alkylene glycols, such as diethylene glycol, polyethylene glycol, bisphenol A and bisphenol sulfone. Still further, also acceptable is a polyester fiber including polyester obtained by using a catalyst containing a specific phosphorus compound and titanium compound, a polyester fiber having a biodegradability such as polylactic acid or stereo-complex polylactic acid, or a chemical-recycled or material-recycled polyester fiber, as described in JP-A-2004-270097 or JP-A-2004-211268.

In the polyester polymer forming the polyester fiber, there may be contained, if required, one or more of a delustering agent (titanium dioxide), a micropore-forming agent (organic sulfonic acid metal salt), an anti-tarnish agent, a thermal stabilizer, a flame retardant (diantimony trioxide), a fluorescent brightener, a color pigment, an antistatic agent (sulfonic acid metal salts), a moisture absorbent (polyoxyalkylene glycol), an antibacterial agent, and other inorganic particles.

The polyester fabric A is preferably a fabric including only a polyethylene terephthalate fiber. Further, from the viewpoint of good quality of the texture and ease of bonding with the waterproof moisture-permeable layer B, the fiber forming the polyester fabric A is preferably a multifilament (long fiber). In that case, in such a multifilament, preferably, the single yarn fineness is within the range of 0.1 to 5.0 dtex (more preferably 0.1 to 2.0 dtex); the total fineness, 20 to 200 dtex (more preferably 30 to 140 dtex); and the number of single yarns, 20 to 200 (more preferably 50 to 200). Whereas, such a multifilament is preferably a textured yarn such as a false twisted and crimped textured yarn or an air textured yarn.

The form of the polyester fabric A is a woven fabric, a knitted fabric, a nonwoven fabric, or the like, and thus has no particular restriction. However, a woven fabric or a knitted fabric is preferable from the viewpoint of the strong tear strength. Out of these, a woven fabric is particularly preferred. Whereas, the weave of the woven fabric or the knitted fabric has no particular restriction. However, a woven or knitted fabric having a multilayered structure of two or more layers is preferable from the viewpoint of the waterproof property. As for the woven fabric, preferred is a multilayered woven fabric which can have a multilayered structure, such as a warp double woven fabric or a weft double woven fabric. Whereas, for the knitted fabrics, preferred are circular knitted fabrics such as ponti roma, Milano rib, tuck rib, back moss (back Kanoko), single pique, double pique, and mesh, warp knitted fabrics such as half, back half, queens cord, and shark skin, and double warp knitted fabrics such as double raschel and double tricot.

In the waterproof moisture-permeable fabric for clothing of the invention, it is preferable that the basis weight of the polyester fabric A for use as the base fabric falls within the range of 30 to 900 $g/m^2$ (more preferably 40 to 700 $g/m^2$).

The polyester fabric A may be, if required, subjected to an aftertreatment such as water-repellent finish, heat accumulating finish, or sweat absorbent finish. However, it is preferably subjected to water-repellent finish in order to repel rainwater. In that case, as the water repellent for use in water repellent finish, there can be used known one such as a paraffin type water repellent, a polysiloxane type water repellent finishing agent, or a fluorine type water repellent finishing agent. The finishing may also be carried out with a known method such as a process in the same bath as in dyeing, a padding method, or a spray method, generally performed.

When the polyester fabric A is a woven or knitted fabric, the dyes for use in dyeing are disperse dyes, cationic dyes, or the like, and thus have no particular restriction. However, a cationic dye requires selection of a fiber dyeable with the cationic dye. Therefore, use of a disperse dye having a higher general versatility is preferred.

When the polyester fabric A is dyed with a disperse dye, it is preferably dyed in a color other than white, such as black, dark blue, blue, or green for the following reason. The polyester fabric A is preferably colored in a color such that dirt is inconspicuous for outer clothes such as outdoor wear and uniforms.

In the waterproof moisture-permeable fabric of the invention, a waterproof moisture-permeable layer B including a colorless transparent polyester film is stacked on one side of the polyester fabric A. As such a waterproof moisture-permeable layer B, a colorless transparent polyester film having a moisture permeability is used. When the film is not a polyester film, an urethane resin and polytetrafluoroethylene are generally used. However, these are not suitable for recycling, and hence are disposed of after use for clothing. On the other hand, when the film is a polyester film, conservation of natural resources and environmental conservation become possible for the following reason: polyester can be recycled as a raw material for polyester again by a chemical recycling treatment, and can be recycled any number of times. The polyester film is required to be colorless and transparent. When the polyester film is not colorless nor transparent, but a white or light color film, in the polyester fiber A serving as the base fabric, the disperse dye used for dyeing sublimates and migrates to the surface on the film side of the waterproof moisture-permeable layer B. Thus, an uneven mottled pattern is formed, which remarkably degrades the appearance. As a method for avoiding this, there is a method in which the color of the polyester fabric serving as the base fabric is limited to white or a light color. In that case, the variation of the commercial products is reduced. Whereas, when the polyester film is not colorless nor transparent, but a black or dark color film, there is no concern of a mottled pattern formed by migration and sublimation of the disperse dye used for dyeing the base fabric (polyester fabric A) to the surface on the film side of the waterproof moisture-permeable layer B. However, when the color of the base fabric is white or light color, the color of the film is seen through the base fabric from the front side (outer air side). Accordingly, the color of the base fabric becomes blurred, so that the appearance is degraded.

Whereas, it is essential that the colorless transparent polyester film is a film having a moisture permeability. The film is preferably a nonporous film containing polyester having a moisture permeability as a main component. This is because of the following: when the polyester film is a porous film, it cannot be colorless and transparent. In order to impart the moisture permeability to polyester, although not particularly limited, a method in which polyethylene glycol is copolymerized with polyester is preferably employed.

Examples of such moisture-permeable polyester may include polyether-ester type elastomers. The polyether-ester type elastomer includes a long chain ester unit and a short chain ester unit. The short chain ester unit is preferably in an amount in the range of 30 to 70% by weight based on the total amount of polyether-ester type elastomer. The polyether-ester type elastomer with a proportion of the short chain ester unit of less than 30% by weight has a relatively low melting point, and is inferior in processability. Whereas, in the case of polyether-ester type elastomer in which the short chain ester unit is in an amount of more than 70% by weight, the melting point is relatively high, and the processability is inferior.

The acid components of the polyether-ester type elastomer may include at least one selected from aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, and 3-sodium sulfoisophthalate, alicyclic dicarboxylic acid such as 1,4-cyclohexanedicarboxylic acid, aliphatic acids such as succinic acid, oxalic acid, adipic acid, sebacic acid, dodecanedioic acid, and dimer acid, or ester formable derivatives thereof. Preferably, mention may be made of terephthalic acid, isophthalic acid, and naphthalene-2,6-dicarboxylic acid, or ester formable derivatives thereof.

It is naturally understood that a part of such acid components (generally, 30 mol % or less based on the total amount of the acid components) may be replaced with other dicarboxylic acid components or oxycarboxylic acid components.

As the glycol components of the long chain ester unit of the polyether-ester type elastomer, mention may be made of at least one of polyalkylene glycols such as polyethylene glycol, poly 1,2-propylene glycol, poly 1,3-propylene glycol, a copolymer of ethylene oxide and propylene oxide, and a copolymer of ethylene oxide and tetrahydrofuran. However, in order to obtain the satisfactory moisture permeability, polyethylene glycol is most preferably mentioned, and the one having an average molecular weight in the range of 600 to 8,000 is preferable. When the average molecular weight is less than 600, satisfactory mechanical physical properties cannot be obtained. On the other hand, when the average molecular weight exceeds 8,000, a problem may be caused in preparation of polyether-ester due to phase separation.

Further, the glycol component of the short chain ester unit of the polyether-ester type elastomer includes ethylene glycol and tetramethylene glycol. Preferably used is the one in which the molar fraction of tetramethylene glycol in the ethylene glycol and tetramethylene glycol is less than 70 mol %. When the tetramethylene glycol is in an amount of more than 70 mol %, the film layer itself becomes soft, but the difference in modulus from the fabric is too large. Accordingly, the flexure resistance is inferior, so that peeling tends to occur at the interface between the film layer and the fabric.

The further preferred range of the molar fraction of the tetramethylene glycol is the range of less than 70 mol % to 50 mol % or more.

Incidentally, in the polymer, if required, various stabilizers, ultraviolet absorbers, and the like may be added.

As the method for forming a film including a polyether-ester type elastomer, desirable is the one using a uniform film with a thickness of preferably 5 to 30 μm, and further preferably 5 to 20 μm, obtained by a known method such as an inflation method or a die extrusion method. When the thickness of the film is less than 5 μm, the operation of lamination becomes difficult. Accordingly, uniform water pressure resistance may not be obtained. Further, the strength of the waterproof moisture-permeable layer B is remarkably reduced. On the other hand, when the thickness of the film exceeds 30 μm, the moisture permeability may be reduced. Further, the flexural rigidity of the waterproof moisture-permeable layer B increases, so that the whole waterproof moisture-permeable fabric becomes hardened, and becomes unsuitable for clothing.

The resulting film can be stacked on the polyester fabric A by various methods such as heat treatment, sewing, or the use of an adhesive.

The polyester for use in the polyester film for the waterproof moisture-permeable layer B may be, other than the foregoing, for example, "a polyester block copolymer containing a hard segment mainly including a crystalline aromatic polyester unit, and a soft segment mainly including an aliphatic polyether unit and/or an aliphatic polyester unit as main constituent components. The details of the polyester block copolymer are described in, for example, paragraphs [0009] to [0015] of JP-A-11-170461.

Figure 2:
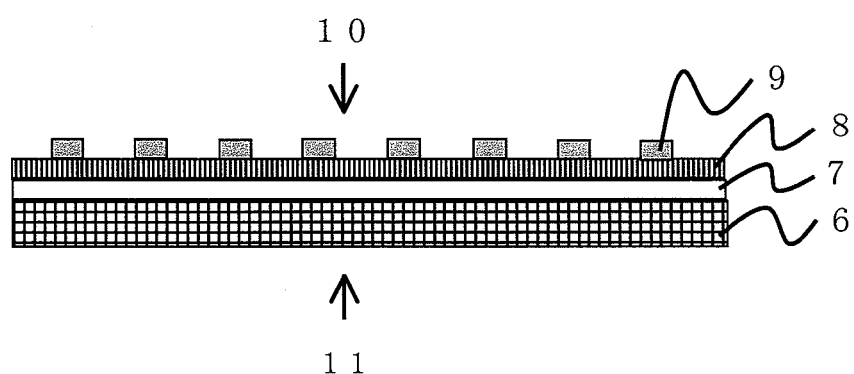
FIG. 2 is a view schematically showing the state of the waterproof moisture-permeable fabric for clothing of the invention, in which a polyester fabric A (base fabric), a waterproof moisture-permeable layer B including a colorless transparent polyester film, a moisture-permeable polymer resin layer D containing inorganic fine particles, and a partially stacked white or gray resin C are sequentially disposed, wherein 6 denotes the polyester fabric A; 7, the waterproof moisture-permeable layer B including a colorless transparent polyester film; 8, the moisture-permeable polymer resin layer D containing inorganic fine particles; 9, the partially stacked white or gray resin C; 10, the film side; and 11, the front side.

In the waterproof moisture-permeable fabric of the invention, a white or gray resin C is partially stacked on the waterproof moisture-permeable layer B. In that case, as shown in FIG. 1, the resin C may be stacked directly on the waterproof moisture-permeable layer B. However, preferably, as shown in FIG. 2, a moisture-permeable polymer resin layer D containing inorganic fine particles is stacked entirely on the waterproof moisture-permeable layer B, and the resin C is partially stacked thereon. When the resin C is directly stacked on the waterproof moisture-permeable layer B as shown in FIG. 1, the polyester film forming the waterproof moisture-permeable layer B is transparent, and hence the film surface may surface-reflect light, thereby to degrade the fineness. Alternatively, when the polymer resin forming the moisture-permeable polymer resin layer D has no moisture permeability, coating over the entire surface thereof damages the moisture permeability of the whole fabric. Therefore, it is essential that the polymer resin has a moisture permeability.

Herein, as the polymer resins forming the moisture-permeable polymer resin layer D, mention may be made of moisture-permeable polyurethane type resins, moisture-permeable polyester type resins, and the like.

The inorganic fine particle contained in the moisture-permeable polymer resin forming the moisture-permeable polymer resin layer D is preferably silica in order to allow the resin-coated surface to provide a smooth and less sticky feel. Particularly, a translucent resin containing inorganic fine particles in a resin weight ratio of 1 to 16% by weight is preferable. Herein, when the content of inorganic fine particles is smaller than 1% by weight, the luster reducing effect becomes small. Whereas, when inorganic fine particles are in an amount of more than 16% by weight, the resin coated surface becomes more rough than necessary.

In the waterproof moisture-permeable fabric of the invention, on the waterproof moisture-permeable layer B or on the moisture-permeable polymer resin layer D, the white or gray resin C is partially stacked. The stacked resin C has a main purpose of protecting the waterproof moisture-permeable layer B or the moisture-permeable polymer resin layer D. However, it also has an effect of suppressing sticking with the skin, and the stickiness by the formation of unevenness on the film side surface (skin-side surface) of the waterproof moisture-permeable layer B. Further, by allowing a design such as a given pattern to come to the surface, the appearance is improved. This can increase the customers' appetites for buying. In that case, it is preferable that the color of the resin C is made different from the appearance color of the waterproof moisture-permeable layer B. The film forming the waterproof moisture-permeable layer B is colorless and transparent. Further, the color of the dyed base fabric is seen through. Accordingly, the appearance color of the waterproof moisture-permeable layer B of the base is the same as the color of the base fabric.

It is essential that the color of the resin C is white or gray. The white and gray colors are adaptable to a wide range of colors of the base fabric. However, in the case of the other colored one, the applicable range of colors of the base fabric is narrowed. In the case where the color of the resin C is a dark color such as black, with the base fabric in a dark color, even when the resin is stacked in a given pattern design, it is difficult to see from the film side. Therefore, the customers' appetite for buying cannot be increased. On the other hand, with the base fabric in a light color, although the pattern design can be seen, the pattern design is seen through as seen from the front side (outer air side), which degrades the appearance. Whereas, in the case where the color of the resin C is a light color or a neutral color other than white and gray, the pattern design can be seen from the film side even when the base fabric is in a dark color or a light color. However, as the dye of the base fabric sublimates and migrates to the resin C, the color of the dye and the original color of the resin are mixed with each other, resulting in a somewhat dappled pattern. As a result, the appearance is remarkably degraded. In the case where the color of the resin C is white or gray, the pattern design is seen from the film side even when the base fabric is in a dark color or a light color. Further, even when the dye of the base fabric sublimates and migrates to the resin C, and even upon mixing with the color of the dye, the color will not be seen as other colors because the original color of the resin is white or gray. Thus, the appearance is difficult to degrade.

Herein, in the resin C, the L value (brightness) of the L*a*b* colorimetric system shown in JIS Z8729 preferably falls within the range of 15 to 97, further preferably falls within the range of 15 to 85, and in particular preferably falls within the range of 20 to 70. Particularly, the resin C preferably exhibits gray color. In that case, the a value and the b value of the L*a*b* colorimetric system shown in JIS Z8729 both preferably fall within the range of −20 to +20 (more preferably −10 to +10, in particular preferably −5 to +5, and most preferably 0 (i.e., achromatic color)).

Herein, although the type of the resin C has no particular restriction, moisture-permeable urethane type resins such as porous urethane resins, non-moisture-permeable urethane type resins, the forgoing moisture-permeable polyester type resins, non-moisture-permeable polyester type resins, acrylic resins, and the like are used. However, the polyester type resins are preferable from the viewpoint of the recyclability of the resulting waterproof moisture-permeable fabric.

Alternatively, when the resin C exhibits gray color, it is preferably a resin containing titanium oxide in a weight ratio of preferably 1% to 25% by weight, and further preferably 1 to 10% by weight, and carbon black in a weight ratio of preferably 0.1% to 3% by weight. When the titanium oxide is in an amount of less than 1% by weight, and carbon black is in an amount of less than 0.1% by weight, the resin does not become gray. On the other hand, when titanium oxide is in an amount of more than 25% by weight, the strength of the resin is reduced. When carbon black is in an amount of more than 3% by weight, the resin becomes black. On the other hand, when the resin C exhibits white color, it is preferably a resin containing titanium oxide in a weight ratio of preferably 1% to 25% by weight, and further preferably 1 to 10% by weight. When titanium oxide is in an amount of less than 1% by weight, the resin does not become white. When titanium oxide is in an amount of more than 25% by weight, the strength of the resin is reduced.

Further, the resin C more preferably further contains silica in a weight ratio of 1 to 16% by weight because it provides a smooth feel. Herein, when silica is in an amount of less than 1% by weight, the effect of providing a smooth feel is less produced. On the other hand, an amount of more than 16% by weight results in more rough feel than necessary. The content of silica is further preferably 7 to 13% by weight.

Figure 3:
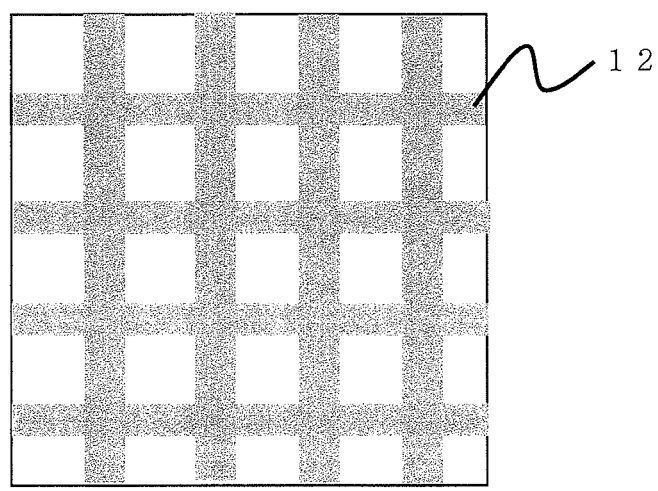
FIG. 3 is a view schematically showing a lattice pattern, wherein 12 denotes the white or gray resin C.

Whereas, it is preferable that resin C covers the waterproof moisture-permeable layer B or the moisture-permeable polymer resin layer D in an area ratio in the range of 10% to 80%, and has a continuous pattern. Herein, when the area ratio is smaller than 10%, it becomes difficult to hold the continuous pattern. On the other hand, an area ratio of more than 80% results in reduction of the moisture permeability of the waterproof moisture-permeable fabric. The area ratio is further preferably 20 to 75%. Herein, the continuous pattern has no particular restriction. However, it is essential that respective resins are combined through a straight line or a curve without separation to cover the whole waterproof moisture-permeable layer B or moisture-permeable polymer resin layer D in a given pattern. Such a pattern is preferably a lattice pattern as shown in FIG. 3. When stacked resins are separated from each other, the degree of friction between the waterproof moisture-permeable layer B at the portion and the skin or the inner clothes increases. Thus, the protection becomes insufficient.

Incidentally, in order to stack the resin C on the waterproof moisture-permeable layer B or the moisture-permeable polymer resin layer D in a continuous pattern, the following or other means may be employed: on a colorless transparent polyester film, or a colorless transparent polyester film including a moisture-permeable polymer resin layer printed thereon, the resin C is printed by means of a gravure roll having the design of a continuous pattern previously formed thereon. Incidentally, the basis weight of the pattern is, in terms of dry film thickness, generally, about 0.1 to 20 g/m$^2$, and preferably 0.5 to 10 g/m$^2$.

In the invention, in order to chemical recycle the waterproof moisture-permeable fabric, and regenerate it as a polyester raw material again, it is preferable that the weight ratio of the polyester based on the total amount of the fabric is 50% or more (further preferably 70% or more). Herein, when the weight ratio of polyester is less than 50%, the recycle efficiency is reduced. Thus, an increase in cost or an increase in energy consumption may be caused. In order to raise the recycle efficiency, the polyester ratio is desirably increased as much as possible. To that end, although the constitution of the waterproof moisture-permeable fabric has no particular restriction, the polyester fabric A is preferably formed only of a polyester fiber.

Herein, the adhesive for bonding the polyester fabric A and the colorless transparent polyester film, the moisture-permeable polymer resin forming the moisture-permeable polymer resin layer D, and the resin C are also preferably polyester type resins. However, this is not essential because the weight thereof based on the total weight of the fabric is small.

In the waterproof moisture-permeable fabric for clothing of the invention, in Embodiment 1, as shown in FIG. 1, the polyester fabric A, the waterproof moisture-permeable layer B including a colorless transparent polyester film, and the partially stacked white or gray resin C are sequentially disposed. Whereas, in Embodiment 2, as shown in FIG. 2, the polyester fabric A, the waterproof moisture-permeable layer B including a colorless transparent polyester film, the moisture-permeable polymer resin layer D containing inorganic fine particles, and the partially stacked white or gray resin C are sequentially disposed. The waterproof moisture-permeable fabric for clothing of the invention has such a configuration. Therefore, it exhibits an excellent appearance quality either as seen from the front side (outer air side), or as seen from the film side (skin side), and is excellent in ease of recycling.

Then, the clothing of the invention is any clothing selected from a group consisting of sport clothes, uniform clothes, rainwear, and outer clothes, including the waterproof moisture-permeable fabric for clothing in such a manner that the film side is the skin side (i.e., in such a manner that the base fabric is on the outer air side).

Such clothing uses the waterproof moisture-permeable fabric for clothing, and hence is easy to recycle, and exhibits an excellent appearance quality.

EXAMPLES

Then, Examples and Comparative Examples of the invention will be described in detail, which should not be construed as liming the scope of the invention.

(1) Basis Weight

The basis weight was measured according to JIS L1096.

(2) L Value

The L value was measured by means of model UV3100S manufactured by SHIMADZU Corporation, Ltd., and is expressed in terms of L*a*b colorimetric system shown in JIS Z8729.

(3) Appearance Quality

The appearance quality of each waterproof moisture-permeable fabric was subjected to a 3-grade evaluation (grade 3: excellent; grade 2; average; grade 1; inferior) by visual observation of 3 examiners.

Example 1

As the base fabric (polyester fabric A), a polyester woven fabric (basis weight 100 g/m$^2$) was obtained in the following manner. By the use of a general polyethylene terephthalate multifilament false twisted and crimped textured yarn of 84 dtex/72 fil (manufactured by TEIJIN FIBERS LIMITED) as a warp and a weft, a gray fabric of a known weft backed weave was woven, and then, was dyed in black with a disperse dye (Kayalon Polyester Black BR-SF, manufactured by NIPPON KAYAKU Co. Ltd.) through a general dyeing step including water-repellent finishing using a fluorine type water-repellent treating agent. Thereafter, on one side of the polyester woven fabric, a colorless transparent nonporous polyester film (trade name: Active Layer manufactured by DuPont Co., Ltd., basis weight 16 g/m$^2$) having a moisture permeability was bonded entirely by means of an urethane type adhesive, thereby to stack the waterproof moisture-permeable layer B (adhesion quantity of adhesive 12 g/m$^2$).

Further, on the waterproof moisture-permeable layer B, a polyurethane type resin obtained by allowing a moisture-permeable polyurethane type resin (CRISVON 8166, manufactured by DAINIPPON INK AND CHEMICALS, Inc.) to contain silica in a solid content ratio of 4% by weight was coated entirely (basis weight 7 g/m$^2$). After drying, a dry heat treatment was carried out at 140° C. for 1 minute, thereby to stack the moisture-permeable polymer resin layer D.

Further, on the moisture-permeable polymer resin layer D, a gray (L value 32) polyurethane type resin (resin C) obtained by allowing a polyurethane type resin to contain titanium oxide in a solid content ratio of 5% by weight, and carbon black in a solid content ratio of 1% by weight was printed in a 4-mm square continuous lattice pattern (area ratio 30%, basis weight 4 g/m$^2$) by means of a gravure coater. After drying, a dry heat treatment was carried out at 140° C. for 1 minute, thereby to obtain a waterproof moisture-permeable fabric.

With the resulting waterproof moisture-permeable fabric, the black base fabric was seen through from the film side (skin side). Thus, the fabric appeared in black with the luster suppressed as a whole. Further, the lattice pattern by the gray resin C could be clearly seen, resulting in a very good appearance (grade 3). Further, the film side surface had a smooth texture. Whereas, polyester was in a weight ratio of 83% based on the total weight of the fabric, and the efficiency by recycling was good.

Then, sport clothes were sewn using the waterproof moisture-permeable fabric such that the film side was the skin side. As a result, they were found to be very good in appearance.

Composition of entirely-coated moisture-permeable polymer resin in Example 1

| | |
|---|---|
| Polyurethane type resin (*1) | 100 parts by weight |
| Crosslinking agent (*2) | 4 parts by weight |
| Smoothing agent | 4 parts by weight |
| Toluene | 30 parts by weight |
| MEK (methyl ethyl ketone) | 30 parts by weight |

(*1) HI-MUREN Y-262 manufactured by Dainichiseika Color & Chemicals Mfg. Co., Ltd., CRISVON 8166 (the same applies hereinafter)
(*2) X-100, manufactured by Dainichiseika Color & Chemicals Mfg. Co., Ltd. (the same applies hereinafter)

Composition of gray print resin in Example 1

| | |
|---|---|
| Polyurethane type resin | 100 parts by weight |
| Crosslinking agent | 4 parts by weight |
| White pigment | 8 parts by weight |
| Black pigment | 2 parts by weight |
| Smoothing agent | 2 parts by weight |
| Silica | 4 parts by weight |
| Toluene | 50 parts by weight |
| MEK (methyl ethyl ketone) | 20 parts by weight |

Comparative Example 1

The experiment was carried out in the same manner as in Example 1, except for using, as the base fabric, a nylon woven fabric obtained by using a nylon multifilament false twisted and crimped textured yarn of 84 dtex/72 fil for a warp and a weft, and dyeing the fabric in black by an acidic dye (Kayanol Milling Black TLB, manufactured by NIPPON KAYAKU Co. Ltd.).

With the resulting waterproof moisture-permeable fabric, the black base fabric was seen through from the film side, so that the fabric appeared in black with the luster suppressed as a whole. Thus, the lattice pattern by the partially stacked resin C was clearly seen therein, resulting in a very good appearance (grade 3). Further, the film side surface had a smooth texture. However, polyester was in a weight ratio of 12% based on the total weight of the fabric, and the efficiency by recycling was bad.

Comparative Example 2

The experiment was carried out in the same manner as in Example 1, except that as the base fabric, a polyester woven fabric obtained by weaving a gray fabric of a known weft backed weave using a general polyethylene terephthalate multifilament false twisted and crimped textured yarn of 84 dtex/72 fil as a warp and a weft, and then, dyeing the fabric in blue with a disperse dye (Kayalon Polyester Blue 2R-SF, manufactured by NIPPON KAYAKU Co. Ltd.) through a general dyeing step including water-repellent finishing, and that as the waterproof moisture-permeable layer B, a black nonporous polyester film containing carbon black in a solid content ratio of 8% by weight was used.

With the resulting waterproof moisture-permeable fabric, the lattice pattern by the partially stacked white resin C was clearly seen in the black film with the luster suppressed as a whole as seen through from the film side, resulting in a very good appearance. Further, the film side surface had a smooth texture. Whereas, polyester was in a weight ratio of 83% based on the total weight of the fabric, and the efficiency by recycling was good. However, when the waterproof moisture-permeable fabric was seen from the front side (the opposite side from the film side), the black color of the film could be seen through, and the blue color of the base fabric became a turbid color, resulting in degraded appearance (grade 1).

Comparative Example 3

The experiment was carried out in the same manner as in Example 1, except that as the resin C partially stacked on the waterproof moisture-permeable layer B, a black polyurethane type resin containing carbon black in a solid content ratio of 5% by weight was used.

With the resulting waterproof moisture-permeable fabric, the lattice pattern by the black resin stacked on the nonporous moisture-permeable transparent polyester film could not be clearly identified as seen from the film side, and the appearance remained unchanged (grade 2). Whereas, the weight ratio of the polyester was 83% based on the total weight of the fabric, and the efficiency by recycling was good.

Composition of black print resin in Comparative Example 3

| | |
|---|---|
| Polyurethane type resin | 100 parts by weight |
| Crosslinking agent | 4 parts by weight |
| Black pigment | 10 parts by weight |
| Toluene | 50 parts by weight |
| MEK | 20 parts by weight |

Example 2

The experiment was carried out in the same manner as in Example 1, except that entire surface coating of the polyurethane type resin (moisture-permeable polymer resin layer D) was not applied onto the waterproof moisture-permeable film.

With the resulting waterproof moisture-permeable fabric, the black base fabric was seen through from the film side, and the lattice pattern by the gray resin stacked on the polyester film could be clearly seen therein, resulting in excellent appearance quality (grade 3). Further, the film side surface had a smooth texture. Whereas, polyester was in a weight ratio of 88% based on the total weight of the fabric, and the efficiency by recycling was good.

Example 3

As the base fabric, a polyester woven fabric (basis weight 100g/m$^2$, polyester fabric A) was obtained in the following manner. By the use of a general polyethylene terephthalate multifilament false twisted and crimped textured yarn of 84 dtex/72 fil as a warp and a weft, a gray fabric of a weft backed weave was woven, and then, was dyed in black with a disperse dye (Kayalon Polyester Black BR-SF, manufactured by NIPPON KAYAKU Co. Ltd.) through a general dyeing step including water-repellent finishing. Thereafter, on one side of the polyester woven fabric, a nonporous moisture-permeable colorless transparent polyester film (trade name: Active Layer manufactured by DuPont Co., Ltd.) was laminated by means of an urethane type adhesive (film 16 g/m$^2$, adhesive 12 g/m$^2$), thereby to stack the waterproof moisture-permeable layer B.

Further, on the waterproof moisture-permeable layer B, a white (L value 72) polyurethane type resin obtained by allowing a polyurethane type resin to contain titanium oxide in a solid content ratio of 15% by weight was printed in a 4-mm square continuous lattice pattern (area ratio 30%, basis weight 4 g/m$^2$) by means of a gravure coater. After drying, a dry heat treatment was carried out at 140° C. for 1 minute, thereby to obtain a waterproof moisture-permeable fabric.

With the resulting waterproof moisture-permeable fabric, the black base fabric was seen through from the film side. Thus, the fabric appeared in black as a whole. Further, the lattice pattern by the white resin could be clearly seen, resulting in a very good appearance (grade 3). Further, polyester was in a weight ratio of 88% based on the total weight of the fabric, and the efficiency by recycling was good.

As wearing was repeated, the dye in the outer material migrated into the white resin, so that the fabric was changed in color to the color slightly close to gray. This was not particular at a problematic level.

Composition of white print resin in Example 3

| | |
|---|---|
| Polyurethane type resin | 100 parts by weight |
| Crosslinking agent | 4 parts by weight |
| White pigment | 10 parts by weight |
| Smoothing agent | 2 parts by weight |
| Toluene | 50 parts by weight |
| MEK (methyl ethyl ketone) | 20 parts by weight |

INDUSTRIAL APPLICABILITY

In accordance with the invention, there are provided a waterproof moisture-permeable fabric for clothing which is easy to recycle, and is excellent in appearance quality, and clothing including the waterproof moisture-permeable fabric. The industrial value thereof is extremely large.

The invention claimed is:

1. A waterproof moisture-permeable fabric for use in clothing, comprising: on one side of a polyester fabric A, a waterproof moisture-permeable layer B including a colorless transparent polyester film stacked, and a white or gray resin C partially stacked thereon; wherein the resin C is a polymer resin containing titanium oxide in a weight ratio of 1 to 25% by weight, and carbon black in a weight ratio of 0.1 to 3.0% by weight.

2. The waterproof moisture-permeable fabric for clothing according to claim 1, wherein a moisture-permeable polymer resin layer D containing inorganic fine particles is stacked entirely on the waterproof moisture-permeable layer B, and further thereon, the resin C is partially stacked.

3. The waterproof moisture-permeable fabric for clothing according to claim 1, wherein the brightness of the resin C falls within the range of 15 to 97 in terms of L value.

4. The waterproof moisture-permeable fabric for clothing according to claim 1, wherein the brightness of the resin C falls within the range of 15 to 85 in terms of L value, and the resin C is gray.

5. The waterproof moisture-permeable fabric for clothing according to claim 1, wherein the polyester fabric A is a woven or knitted fabric including a polyester multifilament.

6. The waterproof moisture-permeable fabric for clothing according to claim 1, wherein the polyester fabric A has been dyed with a disperse dye.

7. The waterproof moisture-permeable fabric for clothing according to claim 1, wherein the colorless transparent polyester film forming the waterproof moisture-permeable layer B is a colorless transparent nonporous film containing polyester having a moisture permeability as a main component, and having a thickness of 5 to 30 μm.

8. The waterproof moisture-permeable fabric for clothing according to claim 2, wherein the moisture-permeable polymer resin forming the moisture-permeable polymer resin layer D is a translucent polymer resin containing silica in a weight ratio of 1 to 16% by weight.

9. The waterproof moisture-permeable fabric for clothing according to claim 1, wherein the resin C is a polymer resin further containing silica in a weight ratio of 1 to 16% by weight.

10. The waterproof moisture-permeable fabric for clothing according to claim 1, wherein the resin C covers the waterproof moisture-permeable layer B in an area ratio in the range of 10 to 80%, and has a continuous pattern.

11. The waterproof moisture-permeable fabric for clothing according to claim 2, wherein the resin C covers the moisture-permeable polymer resin layer D in an area ratio in the range of 10 to 80%, and has a continuous pattern.

12. The waterproof moisture-permeable fabric for clothing according to claim 10, wherein the continuous pattern is a lattice pattern.

13. The waterproof moisture-permeable fabric for clothing according to claim 1, wherein the polyester weight ratio in the whole waterproof moisture-permeable fabric is 50% or more.

14. Any clothing selected from a group consisting of sport clothes, uniform clothes, rainwear, and outer clothes, comprising the waterproof moisture-permeable fabric for clothing according to claim 1 such that the film side is the skin side.

15. The waterproof moisture-permeable fabric for clothing according to claim 2, wherein the resin C is a polymer resin containing titanium oxide in a weight ratio of 1 to 25% by weight, and carbon black in a weight ratio of 0.1 to 3.0% by weight.

16. The waterproof moisture-permeable fabric for clothing according to claim 11, wherein the continuous pattern is a lattice pattern.

* * * * *